US009582516B2

United States Patent
McKinnon et al.

(10) Patent No.: US 9,582,516 B2
(45) Date of Patent: Feb. 28, 2017

(54) WIDE AREA AUGMENTED REALITY LOCATION-BASED SERVICES

(71) Applicant: Nant Holdings IP, LLC, Culver City, CA (US)

(72) Inventors: David McKinnon, Culver City, CA (US); Kamil Wnuk, Playa Del Rey, CA (US); Jeremi Sudol, Los Angeles, CA (US); Matheen Siddiqui, Culver City, CA (US); John Wiacek, Culver City, CA (US); Bing Song, La Canada, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 197 days.

(21) Appl. No.: 14/517,728

(22) Filed: Oct. 17, 2014

(65) Prior Publication Data

US 2015/0109338 A1    Apr. 23, 2015

Related U.S. Application Data

(60) Provisional application No. 61/892,238, filed on Oct. 17, 2013.

(51) Int. Cl.
 *G09G 5/00*  (2006.01)
 *G06F 17/30* (2006.01)
 *G06T 19/00* (2011.01)

(52) U.S. Cl.
CPC ... *G06F 17/30244* (2013.01); *G06F 17/30265* (2013.01); *G06T 19/006* (2013.01)

(58) Field of Classification Search
CPC .................................................. G06T 19/006
See application file for complete search history.

(56) References Cited

U.S. PATENT DOCUMENTS 6,130,673 A * 10/2000 Pulli ........................ G06T 17/30
345/423
7,016,532 B2   3/2006  Boncyk et al.
(Continued)

FOREIGN PATENT DOCUMENTS

KR    10-2010-0124947 A    11/2010
KR       10-1171264 B1     8/2012
(Continued)

OTHER PUBLICATIONS

Zhu et al., The geometrical properties of irregular two-dimensional Voronoi tessellations, Philosophical Magazine A, vol. 81, No. 12, 2001, pp. 2765-2783.*
(Continued)

*Primary Examiner* — Charles Tseng
(74) *Attorney, Agent, or Firm* — Mauriel Kapouytian Woods LLP; Serge Krimnus; Michael Mauriel

(57) ABSTRACT

Apparatus, methods and systems of providing AR content are disclosed. Embodiments of the inventive subject matter can obtain an initial map of an area, derive views of interest, obtain AR content objects associated with the views of interest, establish experience clusters and generate a tile map tessellated based on the experience clusters. A user device could be configured to obtain and instantiate at least some of the AR content objects based on at least one of a location and a recognition.

50 Claims, 6 Drawing Sheets

(56) References Cited

U.S. PATENT DOCUMENTS

| | | | |
|---|---|---|---|
| 8,218,873 | B2 | 7/2012 | Boncyk et al. |
| 8,224,077 | B2 | 7/2012 | Boncyk et al. |
| 8,224,078 | B2 | 7/2012 | Boncyk et al. |
| 8,321,527 | B2 | 11/2012 | Martin et al. |
| 8,519,844 | B2 | 8/2013 | Richey et al. |
| 8,700,060 | B2 | 4/2014 | Huang |
| 2008/0154538 | A1* | 6/2008 | Stathis ............... G01C 15/002 702/152 |
| 2009/0131080 | A1 | 5/2009 | Nadler et al. |
| 2009/0289956 | A1* | 11/2009 | Douris ............... G01C 21/3602 345/633 |
| 2010/0185529 | A1* | 7/2010 | Chesnut ............... G06Q 30/00 705/26.1 |
| 2010/0321389 | A1* | 12/2010 | Gay ..................... G11B 27/036 345/427 |
| 2010/0328344 | A1 | 12/2010 | Mittila et al. |
| 2011/0216002 | A1* | 9/2011 | Weising ............... G09G 5/08 345/158 |
| 2011/0316880 | A1* | 12/2011 | Ojala ..................... G06T 19/006 345/633 |
| 2012/0075342 | A1* | 3/2012 | Choubassi ............. G06T 7/0081 345/633 |
| 2012/0127201 | A1 | 5/2012 | Kim et al. |
| 2012/0149415 | A1 | 6/2012 | Valaee et al. |
| 2012/0162255 | A1* | 6/2012 | Ganapathy ............ H04L 67/38 345/633 |
| 2012/0163672 | A1 | 6/2012 | McKinnon |
| 2012/0229607 | A1 | 9/2012 | Baker et al. |
| 2013/0003708 | A1 | 1/2013 | Ko et al. |
| 2013/0040660 | A1 | 2/2013 | Fisher et al. |
| 2013/0073988 | A1 | 3/2013 | Groten et al. |
| 2013/0083063 | A1* | 4/2013 | Geisner ................ G06T 19/006 345/633 |
| 2013/0124326 | A1 | 5/2013 | Huang et al. |
| 2013/0147836 | A1* | 6/2013 | Small ..................... G06F 3/011 345/633 |
| 2013/0147837 | A1 | 6/2013 | Stroila |
| 2013/0182108 | A1* | 7/2013 | Meadow ............... G06T 17/05 348/143 |
| 2013/0265387 | A1 | 10/2013 | Jin |
| 2013/0272548 | A1* | 10/2013 | Visser ................ G06K 9/00624 381/122 |
| 2013/0282345 | A1* | 10/2013 | McCulloch ........... G06T 19/006 703/6 |
| 2014/0011518 | A1 | 1/2014 | Valaee et al. |
| 2014/0161323 | A1 | 6/2014 | Livyatan et al. |
| 2014/0184749 | A1 | 7/2014 | Hilliges et al. |
| 2015/0172626 | A1* | 6/2015 | Martini ............... G06T 7/0065 348/50 |

FOREIGN PATENT DOCUMENTS

| | | | |
|---|---|---|---|
| WO | 2007-140155 | A2 | 12/2007 |
| WO | WO 2007/140155 | A2 | 12/2007 |
| WO | 2013-023705 | A1 | 2/2013 |
| WO | WO 2013/023705 | A1 | 2/2013 |

OTHER PUBLICATIONS

Pang et al., Development of a Process-Based Model for Dynamic Interaction in Spatio-Temporal GIS, GeoInformatice 6:4, 2002, pp. 323-344.*

Li, Minyang, et al., "3-D Motion Estimation and Online Temporal Calibration for Camera-IMU Systems," Proceedings of the IEEE International Conference on Robotics and Automation (ICRA), Karlsruhe, Germany, May 6, 2013, 8 pages.

3D Laser Mapping, "3D Laser Mapping Launches Mobile Indoor Mapping System," downloaded from http://www.3dlasermapping.com/news-events/news-stories/164-3d-laser-mapping-launch; Dec. 3, 2012, 1 page.

Banwell, Tom, et al., "Combining Absolute Positioning and Vision for Wide Area Augmented Reality," International Joint Conference on Computer Vision, Imaging and Computer Graphics Theory and Applications, May 17, 2010, 4 pages.

Vu, Hoang-Hiep, et al., "High Accuracy and Visibility-Consistent Dense Multiview Stereo," IEEE Transactions on Pattern Analysis and Machine Intelligence, vol. 34, No. 5, May 2012, 13 pages.

Li, Minyang, et al., "High-Fidelity Sensor Modeling and Self-Calibration in Vision-aided Inertial Navigation," Proceedings of the IEEE International Conference on Robotics and Automation (ICRA), Hong Kong, May 31, 2014, 8 pages.

Vondrick, Carl, et al., "HOGgles: Visualizing Object Detection Features," International Conference on Computer Vision (ICCV), Sydney, Australia, Dec. 1, 2013, 9 pages.

Mourikis, Anastasios, et al., "Methods for Motion Estimation With a Rolling-Shutter Camera," Proceedings of the IEEE International Conference on Robotics and Automation (ICRA), Karlsruhe, Germany May 6-10, 2013, 4697-4704.

Li, Minyang, et al., "Online Temporal Calibration for Camera-IMU Systems: Theory and Algorithms," International Journal of Robotics Research, vol. 33, No. 6, Jun. 2014.

Mourikis, Anastasios, "Method for Processing Feature Measurements in Vision-Aided Inertial Navigation," [2013], 3 pages.

Li, Minyang, et al., "Real-Time Motion Tracking on a Cellphone Using Inertial Sensing and a Rolling-Shutter Camera," Proceedings of the IEEE International Conference on Robotics and Automation (ICRA), Karlsruhe, Germany May 6, 2013, 8 pages.

Panzarino, Matthew, "What Exactly WiFiSlam Is, and Why Apple Acquired It," downloaded from http://thenextweb.com/apple/2013/03/26/what-exactly-wifislam-is-and-why-apple-acquired-it, Mar. 26, 2013, 10 pages.

International Search Report and Written Opinion Issued in International Application No. PCT/US2014/061283 dated Aug. 5, 2015, 11 pages.

* cited by examiner

WIDE AREA AUGMENTED REALITY LOCATION-BASED SERVICES

This application claims priority to U.S. Provisional Application No. 61/892,238, filed Oct. 17, 2013. U.S. Provisional Application No. 61/892,238 and all other extrinsic references referenced herein are incorporated by reference in their entirety.

FIELD OF THE INVENTION

The field of the invention is augmented reality service technologies.

BACKGROUND

The following description includes information that may be useful in understanding the present invention. It is not an admission that any of the information provided herein is prior art or relevant to the presently claimed invention, or that any publication specifically or implicitly referenced is prior art.

As advances in technology continue to be developed, the utilization of Augmented Reality (AR) to enhance experiences is becoming increasingly popular. Various entities have attempted to capitalize on this increasing popularity by providing AR content to users based on specific types of object recognition or location tracking.

For example, U.S. Pat. No. 8,519,844 to Richey et al., filed on Jun. 30, 2010 contemplates accessing first and second location data, wherein the second location data has increased accuracy regarding the location of a device, and communicating augmented data to the device based on the location data.

The '844 patent and all other publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Another example of location based content services, while not directed to AR content, can be found in U.S. Pat. No. 8,321,527 to Martin, et al, filed on Sep. 10, 2009, which describes a system for scheduling content distribution to a mobile device by storing different locations, collecting user location data over a period of time, collecting wireless signal strength data, and scheduling pre-caching of content to the device if the user is predicted to be at a location with poor signal strength.

Still further, various other examples of systems and methods for providing content to a user based on a location or other parameter can be found in International Patent Application Publication Number WO 2013/023705 to Hoffman, et al, filed on Aug. 18, 2011, International Patent Application Publication Number WO 2007/140155 to Leonard, et al, filed on May 21, 2007, U.S. Patent Application Publication Number 2013/0003708 to Ko, et al, filed on Jun. 28, 2011, U.S. Patent Application Publication Number 2013/0073988 to Groten, et al, filed on Jun. 1, 2011, and U.S. Patent Application Publication Number 2013/0124326 to Huang, et al, filed on Nov. 15, 2011.

While some of the known references contemplate refining location identification or pre-caching content based on location information, they fail to consider that areas have various views of interest, and fail to differentiate between sub-areas based on AR content densities. Viewed from another perspective, known location based systems fail to contemplate segmenting an area into clusters based on what is viewable or what AR content is available.

Thus, there is still a need for improved AR service technologies, and especially location based AR service technologies.

SUMMARY OF THE INVENTION

The inventive subject matter provides apparatus, systems and methods in which AR content is provided to one or more user devices based on at least one of location identification and object recognition. In some contemplated aspects, the user device could be auto-populated with AR content objects based on a location, and the AR content objects could be instantiated based on object recognition within the location.

One aspect of the inventive subject matter includes a content management system comprising a content management engine coupled with an area database and a content database. The content management engine can be configured to communicate with the databases and perform various steps in order to provide content objects to a device for modification or instantiation.

The area database could be configured to store area data related to an area of interest. This area data could comprise image data, video image data, real-time image data, still image data, signal data (e.g., Compressive Sensing of Signals (CSS) data, Received Signal Strength (RSS), WiFi signal data, beacon signal data, etc.), audio data, an initial map (e.g., CAD drawing, 3-dimensional model, blueprint, etc.), or any other suitable data related to a layout of an area.

The content database could be configured to store augmented reality or other digital content objects of various modalities, including for example, image content objects, video content objects, or audio content objects. It is contemplated that the content objects could be associated with one or more real world objects viewable from an area of interest.

Viewed from another perspective, a content management engine of the inventive subject matter could comprise an AR management engine that is configured to obtain an initial map of an area of interest from the area data within the area database. The step of obtaining the initial map could comprise obtaining a CAD, blueprint, 3-D model, a robot or drone created map, or other representation from the area database itself, or could comprise obtaining area data such as image data, signal data, video data, audio data, views data, viewable object data, points of interest data, field of view data, etc. to generate the initial map.

The AR management engine could then derive a set of views of interest from at least one of the initial map and other area data. The views of interest are preferably representative of where people would, should, or could be looking while navigating through various portions of the area of interest. The views of interest could be derived by the map generation engine, or via recommendations, requests or other inputs of one or more users (e.g., potential viewer, advertiser, manager, developer, etc.), could be created manually by a systems manager or other user, or could be modeled based on some or all of the area data. The views of interest could comprise, among other things, a view-point origin, a field of interest, an owner, metadata, a direction (e.g., a vector, an angle, etc.), an orientation (e.g., pitch, yaw, roll, etc.), a cost, a search attribute, a descriptor set, an object of interest, or any combination or multiples thereof. For example, a view of interest could comprise a view-point origin (i.e., point of view origin), at least one field of interest, and a viewable object of interest. Another view of interest could comprise a view-point origin, at least two fields of interest, and a viewable object of interest.

Once the views of interest have been derived, the AR management engine could obtain a set of AR content objects (e.g., a virtual object, chroma key content, digital image, digital video, audio data, application, script, promotion, advertisement, game, workflow, kinesthetic, tactile, lesson plan, etc.) from the AR content database. Each of the AR content objects will preferably be related to one or more of the derived views of interest. The AR content objects could be selected for obtaining based on one or more of the following: a search query, an assignment of content objects to a view of interest or object of interest within the view, one or more characteristics of the initial map, a context of an intended user of a user (e.g., a potential viewer, advertiser, manager, developer, etc.), or a recommendation, selection or request of a user.

The AR management engine could then establish AR experience clusters within the initial map as a function of the AR content objects obtained and views of interest derived. These clusters will preferably represent a combination of the views of interest and related information, and a density or other characteristic of AR content objects related to the views of interest. Viewed from another perspective, each cluster could represent a subset of the derived views of interest and associated AR content objects.

Based on the AR experience clusters or information related thereto, the AR management engine could generate a tile map comprising tessellated tiles (e.g., regular or non-regular (e.g., semi-regular, aperiodic, etc.), Voronoi tessellation, penrose tessellation, K-means cluster, etc.) that cover at least a portion of the area of interest. Some or all of the tiles could advantageously be individually bound to a subset of the obtained AR content objects, which can comprise overlapping or completely distinct subsets. Additionally or alternatively, the tiles could be associated with one or more of an identification, an owner, an object of interest, a set of descriptors, an advertiser, a cost, or a time. Still further, it is contemplated that the tiles could be dynamic in nature such that the tessellation of the area could change based on an event or a time. Contemplated events include, among other things, a sale, a news event, a publication, a change in inventory, a disaster, a change in advertiser, or any other suitable event. It is also contemplated that a view-point origin, a field of interest, a view or an object of interest could be dynamic in nature.

The AR management engine could further configure a device (e.g., a mobile device, kiosk, tablet, cell phone, laptop, watch, vehicle, server, computer, etc.) to obtain at least a portion of the subset based on the tile map (e.g., based on the device's location in relation to the tiles of a tile map, etc.), and present at least a portion of the AR content objects on a display of the device (e.g., instantiate the object, etc.). It is contemplated that the device could compose a data center and be coupled with a cloud server.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
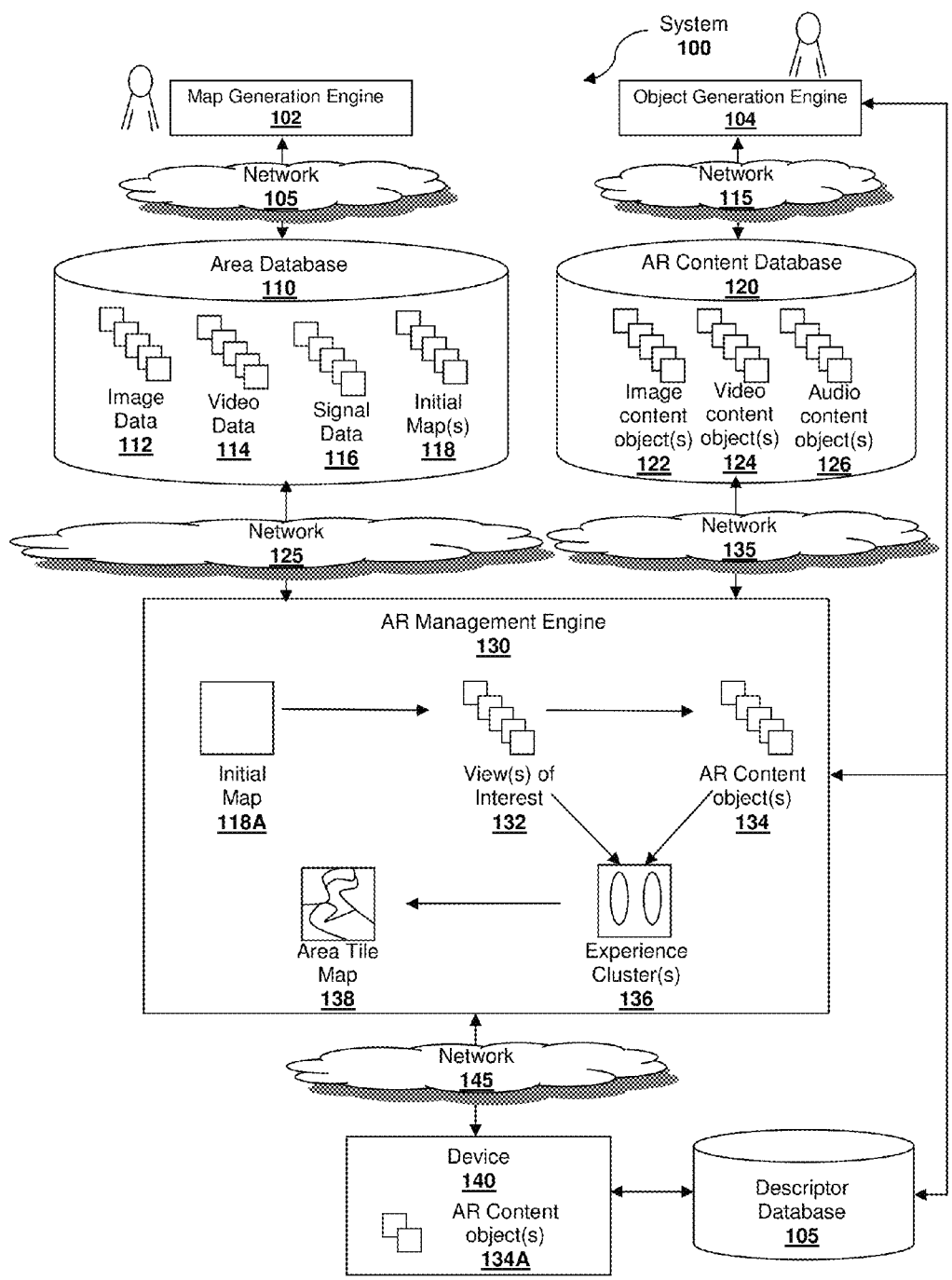
FIG. 1 is a schematic of a system of the inventive subject matter.

It should be noted that while the following description is drawn to a computer/server based device interaction system, various alternative configurations are also deemed suitable and may employ various computing devices including servers, workstations, clients, peers, interfaces, systems, databases, agents, peers, engines, controllers, modules, or other types of computing devices operating individually or collectively. One should appreciate the use of such terms are deemed to represent computing devices comprising at least one processor configured or programmed to execute software instructions stored on a tangible, non-transitory computer readable storage medium (e.g., hard drive, FPGA, solid state drive, RAM, flash, ROM, memory, distributed memory, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

One should appreciate that the disclosed techniques provide many advantageous technical effects including providing augmented reality content to a user device based on a precise location of the user device relative to one or more tiles of a tessellated area associated with view(s) of interest.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A system of the inventive subject matter could advantageously identify a location of a device at or near a tile of a tessellated area of interest and auto-populate the device with pre-selected content objects based upon the identified location. Exemplary systems and methods for identifying a location of a user or device within or near a tile can be found in U.S. pre-grant publication number 2014/0011518 Valaee, et al, entitled "System, Method And Computer Program For Dynamic Generation Of A Radio Map" and U.S. pre-grant publication 2012/0149415, to Valaee, et al entitled "System, Method and Computer Program for Anonymous Localization".

Where the device is configured or programmed to capture image or other sensor data (e.g., orientation data, position data, etc.) that indicates that an object is viewable by a user of the device, the system can cause the device to instantiate some or all of the content objects based on an association between the viewable object(s) and the content object(s) (e.g., based on at least one of object recognition, orientation, location, etc.). The instantiated AR content object could be presented in any suitable manner, including for example, as an occlusion mask, behind one or more objects, behind an object and in front of a different object, or as a moving object across an object of interest.

FIG. 1 is a schematic of an exemplary system 100 of the inventive subject matter. System 100 comprises a map generation engine 102, which can be leveraged by one or more users to capture, generate, or otherwise obtain area data related to an area of interest. Among other suitable data, area data could comprise image data 112 (e.g., still image data, real-time image data, etc.), video data 114, signal data 116 (e.g., CSS data, RSS data, WiFi signal data, beacon signal data, etc.), and/or initial maps 118 that could be transmitted to and stored in area database 110 via network 105. AR management engine 130, coupled with area database 110 via network 125, can be configured to obtain an initial map 118A related to an area of interest from area database 110, or could be configured to obtain other area data and generate initial map 118A based on the obtained data.

An area of interest can be considered generally to be a real-world space, area or setting selected within which the processes and functions of the inventive subject matter will be carried out. The area of interest can be an a priori, user-defined area or an ad-hoc area generated by the system.

For a priori defined areas, an area of interest can correspond to an existing, predefined boundaries that can be physical (e.g., the physical boundaries of a road or a beachfront up to the water, the structural boundaries of a building, etc.), non-physical (e.g., a geographical boundary, geo-political boundary (e.g., a country border, an embassy's territory, etc.), geofence, territorial boundary (e.g. real-estate property boundaries, etc.), jurisdictional boundary (city, state, town, county, etc.), or other boundary defined by limits or borders not constrained to a physical demarcation) or a combination of both (e.g., a section of a room inside a building defined by some of the walls in the room and also a user-defined boundary bisecting the room, a subway station platform area defined by user-set boundaries and the subway tracks, a park's boundaries having state-defined boundaries over land on some of the sides and a natural boundary such as a river on the remaining side, a landmark whose boundaries are defined by the structural borders of the landmark itself on some sides and by surrounding gardens or walkways on remaining sides, etc.). Thus, it is contemplated that areas of interest can be as large as a state, city, county, town, national park, etc., or as small as a section of a room inside a building or house.

In embodiments, a user can set an area of interest by selecting a pre-existing area from a map, blueprint, etc. For example, selecting a landmark as the area of interest would incorporate the boundaries of the landmark as denoted on a map Likewise, selecting a floor of a building as the area of interest would include the floor as denoted in the official floor plan or blueprints for the building. The user can also set an area of interest by manually setting and/or adjusting the desired boundaries of the area of interest on a graphical user interface. In one example, the user can select a point or coordinate on a rendered digital map and extend the area of interest radially outward from the point. In another example, the user could denote the area of interest on a map, blueprint, floor plan, etc., by manually drawing the line segments corresponding to the boundary or as a bounding box. A user can access map generation engine 102 via a user interface that allows the user to manually generate, via the graphical user interface, and/or adjust the area of interest. Suitable user interfaces include computing devices (e.g., smartphones, tablets, desktop computers, servers, laptop computers, gaming consoles, thin clients, fat clients, etc.) communicatively coupled to the map generation engine 102 and other system components. These user interfaces can include user input devices such a keyboard, mouse, stylus, touchscreen, microphone, etc. to input data into the user interface and output devices such as screens, audio output, sensory feedback devices, etc. to present output data to the user.

Contemplated areas of interest include all suitable interior and outdoor settings. Examples of indoor settings can include a casino, an office space, a retail space, an arena, a school, an indoor shopping center, a department store, a healthcare facility, a library, a home, a castle, a building, a temporary shelter, a tent, an airport terminal, a submarine, or any other interior setting. Examples of outdoor settings can include a stadium, a park, a wilderness area, an arena, a road, a field, a route, a highway, a garden, a zoo, an amusement park, the outside of an airport, the outside of a cruise-ship, a sightseeing tour, a rooftop or any other outdoor setting.

In embodiments, the map generation engine 102 of system 100 can generate an ad-hoc area of interest based on a number of devices detected in a particular area at a particular time. To do so, the map generation engine 102 can receive position data corresponding to a plurality of user devices, via clustering or other statistical algorithms, determine that a threshold number of devices are within a certain distance of one another and/or within or passing through a monitored space or point within a designated area (e.g., a train platform, a point in an airport terminal hallway, etc.). If the threshold is met, the map generation engine 102 can then generate the area of interest such that the area encompasses the cluster and, optionally, an additional distance from the cluster. In a variation of these embodiments, the ad-hoc area of interest can be an a priori area of interest modified according to the number of devices present as well as other factors such as modifications to the real-world area or structure, modifications to traffic patterns, etc. For example, for a train platform corresponding to an a priori defined area of interest, the map generation engine 102 can be programmed to modify the boundaries of the defined area of interest based on the length of the next train (since people are not going to gather around to enter cars beyond the last car in a particular train). One should appreciate that although the area of interest corresponds to a physical location, within the disclosed system the area of interest comprises a data structure that includes attributes and values that digital describe the area of interest. Thus, the area of interest can be considered a digital model or object of the area of interest in a form processable by the disclosed computing devices.

One should appreciate that where area data obtained of different modalities are available, especially where there is a vast amount of area data available, a system of the inventive subject matter could operate with an increased level of accuracy (e.g., accuracy with respect to map dimensions, point of view origins, field of views, views, objects within a view of interest, locations, measurements of six degrees of freedom, etc.). Thus, and viewed from another perspective, the AR management engine 130 could be configured to obtain or otherwise utilize area data comprising different modalities and different views of every portion of the area of interest. This data could be used to obtain an initial map having increased accuracy, and to generate a tile map having increased accuracy such that a user's device could be configured to obtain AR content objects 134 and instantiate those objects at the precise moment (e.g., precise location, precise positioning of the device, etc.) they are intended to be presented.

AR content objects 134 can be data objects including content that is to be presented via a suitable computing device (e.g., smartphone, AR goggles, tablet, etc.) to generate an augmented-reality or mixed-reality environment. This can involve overlaying the content on real-world imagery (preferably in real-time) via the computing device, such that the user of the computing device sees a combination of the real-world imagery with the AR content seamlessly. Contemplated AR content objects can include a virtual object, chroma key content, digital image, digital video, audio data, application, script, promotion, advertisements, games, workflows, kinesthetic, tactile, lesson plan, etc. AR content objects can include graphic sprites and animations, can range from an HTML window and anything contained therein to 3D sprites rendered either in scripted animation or for an interactive game experience. Rendered sprites can be made to appear to interact with the physical elements of the space whose geometry has been reconstructed either in advance, or in real-time in the background of the AR experience.

In some embodiments, AR content objects 134 could be instantiated based on object recognition and motion estimation within an area or interest or movement to or from areas of interest. In such embodiments, it is contemplated that the device configured to obtain AR content objects 134 could comprise at least a camera and a gyroscope. Suitable techniques for image recognition can be found in, among other things, co-owned U.S. Pat. Nos. 7,016,532, 8,224,077, 8,224,078, and 8,218,873, each of which are incorporated by reference herein. Suitable techniques for motion estimation can be found in, among other things, "*3-D Motion Estimation and Online Temporal Calibration For Camera-IMU Systems*" by Li, Mingyang, et al; "*Method For Motion Estimation With A Rolling-Shutter Camera*" by Mourikis, Anastasios, et al; and "*Method For Processing Feature Measurements In Vision-Aided Inertial Navigation*" by Mourikis, Anastasios; each published by the Department of Electrical Engineering, University of California, Riverside and all of which are incorporated by reference in their entirety.

One should also appreciate that there could be a hierarchy of modalities with respect to precision and error tracking, and that this hierarchy could be determined by one or more users, or by the system. Thus, a system manager recognizing that one modality is more reliable than others could cause the map generation engine to prioritize data according to their modality where there is a conflict. For example, audio data in area database 110 could describe a layout of a record store (e.g., distances, signs, merchandise, etc.), while video data in area database 110 could include footage of the record store that conflicts with the audio data. It is contemplated that the audio data could be prioritized over the video data (e.g., based on a time the data was captured, etc.), or that the video data could be prioritized over the audio data (e.g., based on a general increased level of reliability against human error, etc.). The initial map or other map could be generated based on both of the audio and video data, except that the audio data, for example, could be ignored to the extent that it conflicts with the video data.

One possible technology that could be utilized by a system of the inventive subject matter is fingerprint-based techniques using an existing infrastructure. For example, as a user navigates an area of interest with a device having one or more sensors, the device could identify access points throughout various portions of the area, and determine available networks (e.g., wireless networks, etc.), a received or detected signal strength (e.g., WiFi signal, cellular network signal, etc.) at a particular time, or to obtain information related to what a user could observe, hear or otherwise experience in the portions at various times.

It is also contemplated that a series of initial maps could be generated for an area of interest, wherein the initial maps use different portions of the available area data. In such embodiments, the initial map that is obtained by a given AR management engine 130 could be determined based on the sensor(s) being used by the device configured to obtain and instantiate AR content objects. For example, where a user of a record store specific application is navigating the record store using a mobile phone capturing voice inputs of the user, it is contemplated that the initial map obtained by the AR management engine is one generated using more audio data relative to other initial maps of the area. As another example, where the user is navigating the record store using a mobile phone capturing video or image inputs captured by the user, it is contemplated that the initial map obtained by the AR management engine is one generated using less audio data relative to other initial maps of the area.

Initial map 118 can comprise a CAD drawing, a digital blueprint, a three-dimensional digital model, a two-dimensional digital model or any other suitable digital representation of a layout of an area of interest. In some embodiments, the initial map 118 could comprise a digital or virtual construct in memory that is generated by the map generation engine 102 of system 100, by combining some or all of the image data, video data, signal data, orientation data, existing map data (e.g., a directory map of a shopping center already operating, etc.) and other data.

Figure 2:
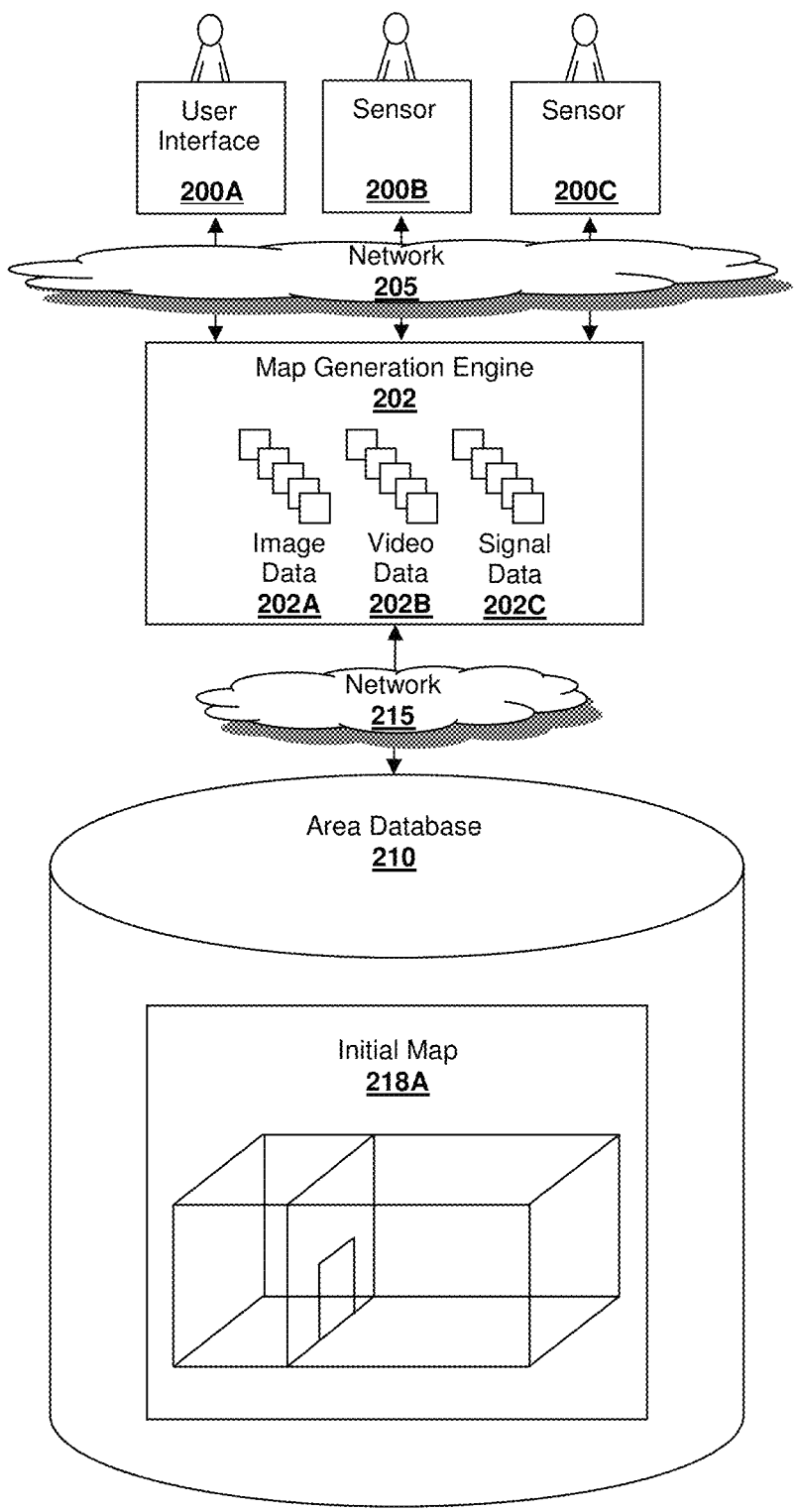
FIG. 2 is a schematic showing a generation of an initial map of an area of interest.

FIG. 2 is a schematic showing a generation of an initial map 118 of an area of interest. As mentioned above, an initial map 118 of an area can comprise a digital or virtual construct, and can be generated via map generation engine 102. In the example shown, map generation engine 202 (corresponding to map generation engine 102 of FIG. 1) is coupled with user interface 200A, sensor 200B (i.e., device comprising a sensor), and sensor 200C via network 205, and configured to generate an initial map based on data (e.g., image data 200A, video data 202B, signal data 202C, etc.) acquired from one or more of user interface 200A, and sensors 200B and 200C.

User interface 200A could be used by one or more users to transmit data related to an area of interest to map generation engine 202. The following use case provides an example of how various users could cause area data to be transmitted to map generation engine 202. Abigail, Bryan and Catherine have each posted various images and videos of the Los Angeles Airport (LAX) on various social networking websites (e.g., Facebook®, MySpace®, Twitter®, Bebo®, Tagged®, Flixster®, Netlog®, etc.). Abigail, visiting from Australia, posted several videos on her Twitter® page arriving and departing from the Tom Bradley International Terminal of LAX. Bryan, visiting New Mexico, posted several images on Facebook® taken from Terminal 1 of LAX. Catherine, picking Bryan up from the airport, posted a video captured while she circled LAX waiting for Bryan to arrive, as well as several photographs taken with Bryan in the parking structure of LAX. David, a system manager responsible for creating a mobile app targeting LAX visitors, obtains the images and videos from Abigail, Bryan and Catherine's profiles, and transmits them to map generation engine 202 via user interface 200A. It should also be appreciated that map generation engine 202 could be coupled with various social networking websites or other sources and automatically obtain area data from those sources, for example, using an Internet bot.

David has also set up various devices throughout LAX having sensors (e.g., 200B and 200C) that captured image data and video data throughout LAX, as well as activity information to determine, or allow a determination of areas having high, medium or low traffic. Area data is transmitted from these devices to map generation engine 202 via network 205. Once the map generation engine 202 receives adequate data, it is contemplated that an initial map 218 of LAX could be generated. The initial map 218 could be generated manually (e.g., a user could utilize the area data to create the initial map, etc.), or by the map generation module 202 itself. For example, the map generation engine 202 can comprise a data compiling module that sorts the area data into groupings (e.g., based on location, based on popularity, etc.), and a mapping module that uses the sorted area data to automatically generate an initial map 218. In some embodiments, it is contemplated that the initial map could provide information not only related to a layout, but also to traffic, popularity, time, or other characteristic related to behavior. Once the initial map is finalized, the map generation engine 202 could transmit the initial map 218 to area database 210 for storage via network 215.

In another example, the sensors (e.g, sensors 200B, 200C) can be placed on a drone or remote-controlled robot that can be programmed to travel within the area of interest to gather the data, and transmit it to map generation engine 202.

To generate the initial map 218, the mapping module of map generation engine 202 can employ a "structure from motion" module capable of generating a 3D map of the geometry depicted in images and thus construct a 3D model of the area of interest. To create a 2D blueprint or floor plan, the map generation engine 202 can "flatten" the constructed 3D model.

During the flattening, the map generation engine 202 can label certain geometric features of interest within the 3D model (e.g., doors, windows, multi-level spaces or structures, overpasses and/or underpasses in a building, etc.) via classifiers trained offline in advance of the flattening process. These classifiers can be mapped to corresponding geometric features of interest via a recognition of these features in the 3D model and/or the image data used to generate the 3D model using image recognition techniques.

Examples of suitable "structure from motion" and other techniques usable in generating the initial map (and/or gathering the data to be used in the generation of the initial map) can include those discussed in U.S. pre-grant publication number 2013/0265387 to Jin, entitled "Opt-Keyframe Reconstruction From Robust Video-Based Structure From Motion" and published Oct. 10, 2013; U.S. pre-grant publication number 2014/0184749 to Hilliges, et al, entitled "Using Photometric Stereo For 3D Environment Modeling" and published Jul. 3, 2014; U.S. pre-grant publication number 2012/0229607 to Baker, et al, entitled "Systems and Methods for Persistent Surveillance And Large Volume Data Streaming" and published Sep. 13, 2012; all of which are incorporated herein by reference in their entirety.

In embodiments, the initial map 218 can be generated using depth sensing, perhaps through LiDAR techniques combined with image recognition techniques. Suitable LiDAR techniques include those employed by the Zebedee indoor mapper developed by CSIRO and GeoSLAM. Depth sensing can also be achieved through image-based analysis such as those disclosed in U.S. pre-grant publication number 2012/0163672 to McKinnon, entitled "Depth Estimate Determination, System and Methods" and published Jun. 28, 2012, which is incorporated by reference in its entirety, as well as the references discussed above.

These techniques allow for the generation of initial map 118 based on data gathered from a single pass through the area of interest, such as the aforementioned drone or remote-controlled robot or drone.

In embodiments, it is contemplated that an initial map 118 can be generated or modified manually via a user interface. For example, one or more users can view a plurality of images showing different portions of an area of interest and manually create a CAD drawing based upon the various images. As another example, it is contemplated that one or more users could utilize software that associates different images and generates area maps using portions of some or all of the images and possibly other sensor data (e.g., audio, notes, etc.).

Based on an applicable initial map 118A (applicable to a selected area of interest) and optional ancillary area data (e.g., image, video, audio, sensor, signal or other data, etc.), the AR management engine 130 can derive a set of views of interest 132 related to the area of interest.

A view of interest 132 is a digital representation of a physical location in real-world space that is to be enabled with AR content. Thus, the view of interest 132 can be considered to be a view or perspective of a view representative of where users would, should, or could be looking while navigating through various portions of the area of interest, for the presentation of AR content.

A view of interest 132 can comprise one or more individual views within an area of interest, from a set of defined perspectives (e.g., from areas near defined points of origin and/or area with a tile, as discussed in further detail below) within the area of interest. The view of interest 132 can include a set of contiguous views within the area of interest, or a set of discontiguous views. Thus, for example, a view of interest 132 in an area of interest can include a view of a section of the area of interest that is in front of a user (and thus, visible to the user at that particular point in time), and another view that is behind the user, across from the first view (and thus, only visible to the user when the user turns around).

The view of interest 132 can be a data construct that typically includes, among other things, one or more point of view origins, at least one field(s) of interest leading to a view, objects of interest within a view, and descriptors associated with objects of interest. The view of interest 132 can also include data associated with one or more of an owner, metadata, a direction (e.g., a vector, an angle, etc.), an orientation (e.g., pitch, yaw, roll, etc.), a cost, a search attribute, or any combination or multiples thereof.

Figure 3:
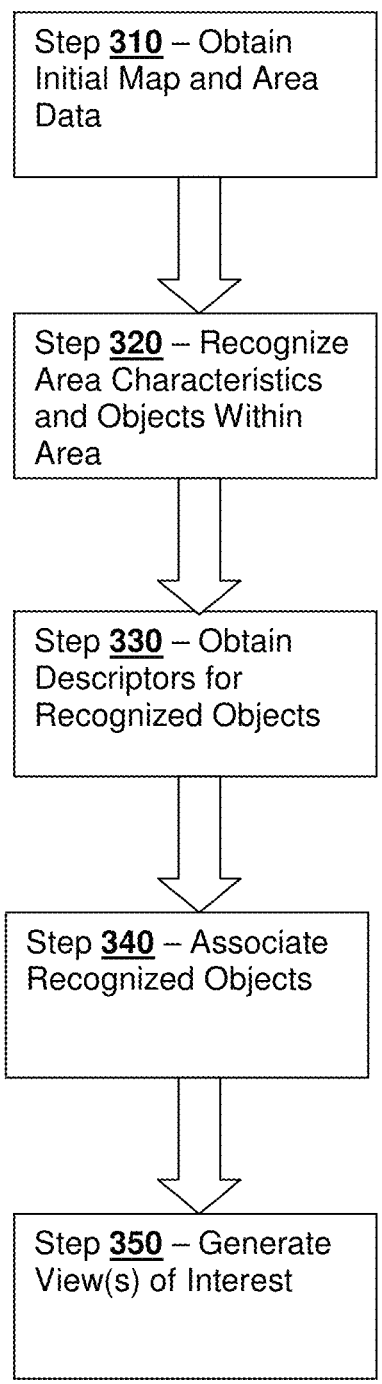
FIG. 3 provides an example overview of the derivation of views of interest.

In embodiments, views of interest 132 within an area of interest can be selected and derived entirely by AR management engine 130. FIG. 3 is an illustrative example of an exemplary process of these embodiments.

At step 310, the AR management engine 130 obtains the initial map 118A and area data associated with the area of interest. As described above, this area data can be image data, video data, audio data, sensor data, signal data, and any other data associated with the area of interest.

At step 320, the AR management engine 130 can employ one or more data analysis and recognition techniques on the area data to assess the characteristics of the area of interest environment and recognize objects in the area of interest environment, as appropriate for the modalities of the area data.

For example, for image or video data, the AR management engine 130 can employ image recognition techniques, such as those mentioned herein, to recognize and identify real-world objects within the area of interest.

For audio data (either audio-only, or accompanying video data), the AR management engine 130 can employ audio recognition and analysis techniques to identify the acoustic characteristics of the environment, locations of sources of sound (e.g., locations of speakers or other audio output devices, sources of environmental noise, etc.), and/or identification of audio (e.g., for music, identify songs, genres, etc.; for sounds, identify the type of sounds, the source producing the sound, etc.).

Sensor data can include temperature sensor data, air pressure sensor data, light sensor data, location-sensor data (e.g., GPS or other location- or position-determination system data), anemometer data, olfactometer data, etc. Correspondingly, the AR management engine 130 can determine the temperature, air flow characteristics, lighting characteristics, smell characteristics and other environmental characteristics for various locations within the area of interest.

Signal data can corresponds to data within and also about signals from routers, signals from cellular transmitters, signals from computing devices (e.g., desktop computers, laptop computers, smartphones, tablets, gaming consoles, remote controls, etc.), broadcast signals (e.g., over-the-air television or radio broadcasts), near-field communication devices, or other emitters of wireless data carrier signals. Types of signals can include WiFi signals, cellular signals, mobile hotspot signals, infrared signals, Bluetooth® signals, NFC signals, ultrasound signals, RFID signals, or any other detectable data carrier signal. The signal data itself can include information such as identification of emitting device, identification of standard(s)/protocol(s), network location information (IP address, etc.), physical location information of emitter, etc. The AR management engine 130 can analyze the signal data (corresponding to the signals themselves and/or the information carried by the signal) to determine the location(s) of various signal emitters with the area of interest, the signal strength of the various signals within the various parts of the area of interest, potential sources of interference, relatively strong/weak areas of various signals, data transmission speeds, etc.

The recognized objects and characteristics of the environment can be associated with particular locations within the area of interest based by correlating the area data with the initial map 118A based on one or more of the location information (e.g., GPS or other location-sensor information) and location information associated with image data (e.g., depth map information or other information indicative of depth in image).

At step 330, the AR management engine 130 can obtain descriptors for the recognized objects within the area of interest. The descriptors can be SIFT descriptors, FAST descriptors, BRISK descriptors, FREAK descriptors, SURF descriptors, GLOH descriptors, HOG descriptors, LESH descriptors, etc. In embodiments, the AR management engine 130 can obtain the descriptors from a descriptor database corresponding to various objects capable of being recognized. In embodiments, the AR management engine 130 can derive the descriptors itself, according to known techniques.

At step 340, the AR management engine 130 can associate at least some of the recognized objects within the area of interest with AR content types or categories. These recognized objects can be considered to be potential "attachment points" for AR content. These attachment points can be identified as potential objects to which AR content objects can be associated within the area of interest to varying levels of specificity or granularity. In other words, the "type" of AR content object identified as applicable to the attachment point can be of a variety of levels of generality or granularity. Certain attachment points can be theme- or topic-independent, merely identified as suitable object to which content can be attached or associated. Examples of these types of attachment points can be recognized billboards, large sections of wall, plants, floor patterns, signage, logos, structural supports, etc. Other attachment points can be topic- or theme-specific to various levels of specificity. For example, if a car is recognized within area of interest, the AR management engine 130 is programmed to associate the recognized "car" to AR content object categories associated with cars. However, the "car" category can have further subcategories of "sports car", "SUV", "luxury car", etc. Thus, the "car" can be associated with AR content object(s) from one or more applicable sub-categories. In embodiments, the association of step 340 can be based on the descriptors obtained in step 330. In embodiments, the descriptors of step 330 can correspond to categories of recognized objects on their own, and thus the steps 330 and 340 are effectively merged into a single step.

In embodiments, the associations made by the AR management engine 130 can be based on the categorization of the recognized object according to the recognition technique employed.

In embodiments, the associations can be a pre-set association set by system administrators. Thus, the associations can be such that when a "car" is recognized, the AR management engine 130 associates the "car" with AR content objects of the "car" type. This can include associating the recognized "car" only with "car"-type AR content objects, thus ignoring other potential AR content objects that would otherwise be similarly associated with the car.

At step 350, the AR management engine 130 generates the one or more views of interest 132 for the area of interest based on the initial map 118A and the area data. To determine what part of the area of interest (reflected in the initial map 118A) will constitute a view of interest 132, the AR management engine 130 analyzes the distribution (e.g., density, layout, etc.) of recognized or recognizable objects within the initial map 118A, including the recognized objects from the perspective of possible point of view origins. The analysis can correspond to a cluster analysis of recognized objects within a particular spatial relationship of one another, and also to possible point-of-view origins. The point-of-view origins correspond to various points within the area of interest from which a user will view a view of interest 132 or part of a view of interest 132. Thus, the location, size and shape of a view of interest can be determined based on having a certain amount (minimum or maximum) of recognized objects within the view of interest, a certain density of recognized objects, a certain layout, etc. For example, the system could assign a point in space for each recognizable object. The point in space might be the centroid of all the image descriptors associated with the recognized object as represented in 3-space. The system can then use clusters of centroids to measure density. In embodiments, the point-of-view origin can correspond to the point of origin of the area data such as image keyframe data was captured during the initial map-making process.

In embodiments, the views of interest 132 can be based on area data of one or more modalities of the area data as applied to the initial map 118A. For example, candidate views of interest 132 for an area of interest can be limited to those sections of the area that were captured by visual data (i.e., image or video data). In further embodiments, candidate views of interest can be based on one or more of the area data as applied to initial map 118A and modified by additional area data. For example, a candidate view of interest 132 for an area can be initially defined by image or video data gathered (that directly show potential views of interest 132 captured visually), which can be expanded or constricted or even eliminated as a candidate based on sound, temperature or other sensor data. In this example, sound data could indicate that there is consistent background audio noise in the particular section of the area of interest being considered, thus being a less desirable candidate for certain AR content objects having audio and also indicative of the fact that people passing through might move quickly and be less inclined to stop and consume presented content.

Based on the initial map 118A as well as the area data, the AR management engine 130 can determine potential fields of interest for each view of interest 132. A field of interest can be considered to be the perspective or field of view that leads to a view of a part of or all of a view of interest 132. In other words, the field of interest can be considered to be a potential field of view of a user (i.e., the user's visible area as seen through a display device on a smartphone or other computing device that displays a live video feed, via AR goggles or glasses, etc.) that would cause the user to see a particular view within a larger view of interest 132 at any given time. Thus, if a view of interest 132 includes a section of the area of interest in front of the user as well as behind the user, the view of interest 132 is considered to have at least two fields of interest—one that captures the view of interest 132 portion in front of the user (which would be considered a first view within view of interest 132), and another that corresponds to the field of view of the portion of the view of interest 132 behind the user, requiring the user to turn around to see it (which would be considered a second view within view of interest 132). Additionally, the fields of interest can account for obstructions and other obstacles that would interfere with the user's view of some or all of a view of interest 132.

It should be appreciated that the area data gathered to generate views of interest 132 could be derived in any commercially suitable manner (e.g., crowd sourced using ambient collection, GoPro® or other suitable technologies, using available image, video or other data, customized through paid-for data, automated drones, etc.). The following use case illustrates one method in which view(s) of interest could be derived in a customized manner. A system manager hires various shoppers (Martin, Nick, Mei and Bob) at The Grove® shopping mall to videotape their shopping experience. Each shopper is to wear a video capturing device (e.g., attached to the shopper's hat, shirt, etc.) while they go about their usual shopping experience. In some embodiments the shoppers could be selected based on a similarity in interests or other characteristics (e.g., age, gender, income, demographic, psychographic, employment, sexual orientation, etc.). This could be advantageous where a system wishes to cater to a selected group of people (e.g., high school kids from affluent neighborhoods, etc.) In this example, Martin, Nick, Mei and Bob are selected because of the dissimilarity in interests, age and gender. This could be advantageous where a system wishes to cater to a wide range of people regardless of their interests.

Martin and Nick each wear their video cameras on their hat as they navigate The Grove® together. Because their interests are widely varied, the field of views and objects that are captured from the same or substantially similar point of view origin could be very different. For example, while Martin and Nick could each be standing two feet apart from each other next to the fountain at the Grove®, Martin could be capturing video data including the sky and the movie theatre, while Nick could be capturing video data including the Nordstrom®, the Farm® restaurant, and Crate and Barrel®. Meanwhile, Bob could be sitting at the Coffee Bean® capturing video data including various portions of the farmer's market neighboring the Grove®, while Mei could be inside The Children's Place® shopping for her kids and capturing video data including various portions of the store.

Based on the initial map 118A and the video data captured by Martin, Nick, Bob and Mei, the AR management engine 130 could derive a set of views of interest 132. It is contemplated that some or all of the view of interest information could be derived by the AR management engine 130. Alternatively or additionally, some or all of the view of interest information could be derived elsewhere and obtained by the AR management engine 130 (e.g., descriptor information, etc.).

While the above example focuses on obtaining views of interest 132 from specifically selected individuals, it should be appreciated that views of interest 132 could be obtained using any suitable method. For example, images could be taken from one or more specifically adapted vehicles, robots or other devices and stitched together to produce a segmented panorama or high resolution image. Each device could be configured to obtain image data from various angles at different heights. Additionally or alternatively, the devices could include 3G, 4G, GSM, WiFi or other antennas for scanning 3G, 4G, GSM, WiFi or other signals and hotspots. As another example, the system could leverage asset tracking (e.g., RFIDs, etc.) or crowd sourcing technologies to obtain area data from users who do not have a specific goal of providing area data for purposes of generating initial and tessellated maps.

In embodiments, views of interest 132 can be selected by human users (e.g., a system administrator, advertiser, merchant, etc.) for derivation by the AR management engine 130. In these embodiments, the area data (such as the image data corresponding to the views) can be presented to users from which the human user(s) can select a corresponding view of interest 132. For example, an advertiser can be shown image data of various sections of the area of interest. From these images, the advertiser can select one or more images showing a particular section of the area of interest that the advertiser wishes to use to present advertisements to users. The AR management engine 130 can then generate the view of interest 132 corresponding to the selected section based on the initial map 118A and the area data associated with the selected section of the area of interest.

System 100 can also comprise an object generation engine 104, which could obtain a plurality of content objects (e.g., image content objects 122, video content objects 124, audio content objects 126, etc.) from one or more users or devices, and transmit the objects to AR content database 120 via network 115. For example, a system manager could upload AR content obtained from various advertisers who wish to advertise a good or service to people visiting or residing in an area of interest (such as a shopping mall). The system manager could also include ancillary information such as advertiser preferences, costs, fees, priority or any other suitable information. The AR content objects and the ancillary information could be stored in the database, and could be associated with various descriptors (e.g., SIFT, FAST, BRISK, FREAK, SURF, GLOH, HOG, LESH, TILT, etc.) stored in database 105 by one or both of the object generation engine 104 or the AR management engine 130.

Once the views of interest 132 have been derived, and AR content objects have been generated, AR management engine 130 could obtain a set of AR content objects 134 (e.g., from the AR content database 120 via network 135) related to the derived set of views of interest 132. It should be appreciated that the set of AR content objects 134 could be obtained in any suitable manner, including for example, based on a search query of AR content database 120 (e.g., a search for AR content objects 134 in database 120 that are associated with one or more descriptors that are associated with one or more views of interest 132, etc.), based on a characteristic of the initial map 118A (e.g., dimensions, layout, an indication of the type of area, etc.), based on a user selection, recommendation or request (e.g., by an advertiser, merchant, etc.), or based on a context of an intended use of a user (e.g., based on what activities a user wishes to capture (e.g., shopping, educational, sightseeing, directing, traveling, gaming, etc.).

As a function of at least one of the AR content objects 134 and the set of views of interest 132, AR management engine 130 establishes AR experience clusters 136 within initial map 118A or as a new map.

For example, AR experience clusters 136 can be established to include one or more point of view origins from which objects of interest could be viewed based on a density of AR content objects 134 associated with the point of view origins of the various views of interest 132. Viewed from another perspective, each experience cluster 136 can include point of view origins such that the point of view origin(s) in each cluster correspond to a substantially equal percentage (e.g., deviations of ≤5%, ≤3%, ≤1%, etc. from each of the other clusters) of the total AR content objects 134. As another example, each experience cluster could include point of view origins such that the point of view origin(s) in each cluster correspond to a substantially equal percentage (e.g., deviations of ≤5%, ≤3%, ≤1%, etc. from each of the other clusters) of at least one of the following: video content objects 124, image content objects 122, and audio content objects 126. As yet another example, one or more of the experience clusters could include point of view origin(s) that are associated with only a few AR content objects (e.g., less than 10, less than 5, less than 3, 1, etc.), for example where an advertiser has paid a premium to obtain the exclusivity, whereas the remaining experience clusters could include point of view origins that are associated with more AR content objects 134 (e.g., at least 50% more, at least 100% more, at least 200% more, at least 300% more, at least 400% more, at least 500% more, etc.). One should appreciate that a cluster could be established based on any suitable parameter(s), which could be established manually by one or more users, or automatically by a system of the inventive subject matter.

It should be appreciated that, for point of view origins of various distances, a same section of the area of interest can have multiple views of interest 132 and/or multiple experience clusters 136. For example, an area of interest has a wall with a number of advertisement poster objects that have been recognized and potentially can be linked to AR content objects. As a user gets closer to the wall, there will be less posters appearing in the user's field of view. Conversely, as the user gets farther away from the wall, there will be more posters appearing within the user's field of view. In this example, multiple view of interest 132 can be derived to account for the differences in the amount of potential recognized attachment points (the recognized poster objects) at different view point-of-origin distances.

Based on the established AR experience clusters 136, the AR management engine 130 could generate an area tile map 138 of the area of interest. The tile map 138 could comprise a plurality of tessellated tiles covering the area of interest or portion(s) thereof. Depending on the parameters used to establish the AR experience clusters 136, the area tile map 138 could comprise a regular tessellation, a semi-regular tessellation, an aperiodic tessellation, a Voronoi tessellation, a Penrose tessellation, or any other suitable tessellation. The concepts of establishing experience clusters and generating tile maps are discussed in further detail below with FIGS. 5 and 6.

The AR management engine 130 in some embodiments could be coupled with a device 140 (e.g., cell phone, tablet, kiosk, laptop computer, watch, vehicle, etc.) via network 145, and configure the device to obtain at least a portion of the subset of the AR content objects depending on at least one of the following: the location of the device within an area of interest (e.g., within a location represented within a tile of area tile map 138, etc.), and the objects viewable by the device or a user of the device. For example, it is contemplated that an area tile map 138 could comprise a first tile that is representative of portions of the area map corresponding to point of view origins located next to the fountain and next to Crate and Barrel® at the Grove®. The area tile map 138 could also comprise a second tile bordering a portion of the first tile, which is representative of portions of the area map corresponding to point of view origins located next to the Coffee Bean® and next to the Children's Place® at the Grove®. As a user carrying device 140 comes closer to the portion of the Grove® represented by first tile of the map from a portion represented by the second tile of the map, the user device 140 can be auto-populated with a subset of AR content objects 134A associated with the first tile map. When the user walks to or near a point of view origin and captures image data related to an object of interest within a view of interest, system 100 could associate the object of interest with one or more of the subset 134A (e.g., based on a descriptor or other identification, etc.) and instantiate them for presentation to the user.

Figure 4:
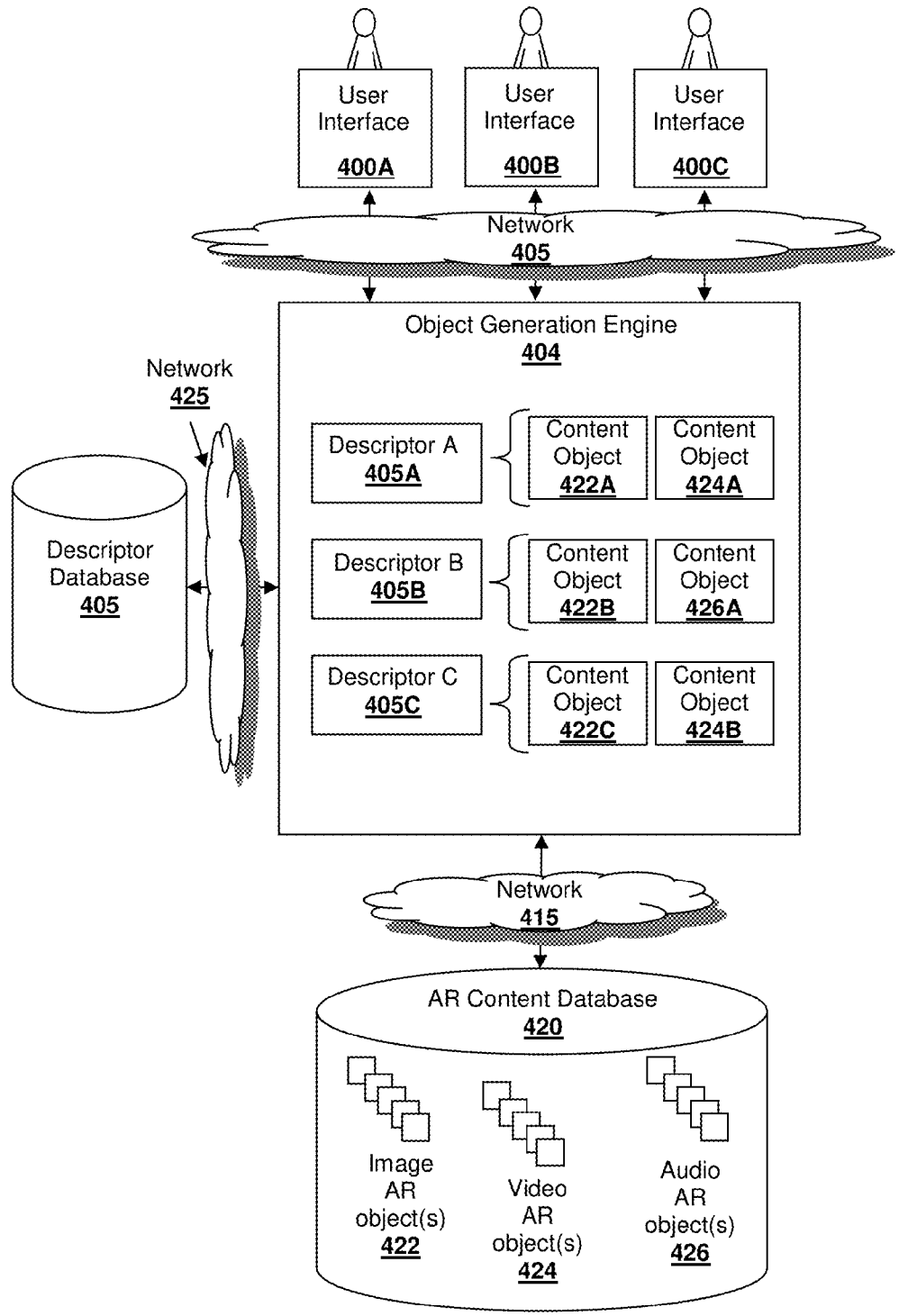
FIG. 4 is a schematic showing a generation of an AR content database.

FIG. 4 is a schematic showing the generation of an AR content database 420. Object generation engine 404 is coupled with descriptor database 405, AR content database 420, and user interfaces 400A, 400B, and 400C via networks 425, 415 and 405, respectively. The following use case provides an example of how AR content objects can be associated with one or more descriptors related to objects viewable from an area of interest, and stored in an AR content database 420 for use by an AR management engine of the inventive subject matter.

In the example shown in FIG. 4, descriptor database 405 comprises information related to various objects viewable from within the Aria® Hotel and Casino in Las Vegas (the area of interest). Descriptor database 405 could comprise, among other things, object image data, descriptors associated with the image data, and information relating to the device capturing the object image data (e.g., translation data (heaving, swaying, surging), rotation data (e.g., pitching, yawing, rolling), distance, clarity, brightness, location, etc.). While this example is generally related to associating a descriptor with an object generally (without consideration for a specific portion of the object or the device capturing data related to the object, etc.), it should be appreciated that obtaining information related to the data capturing device at the time of capture could be valuable in providing an increased level of accuracy as an object captured from one position, view or angle could be associated with AR content objects that are different from the same object when captured from a different position, view or angle.

For example, descriptor database 405 could comprise descriptor set A (405A) including SIFT descriptors associated with an image of the host desk of the Aria® poker room, descriptor set B (405B) including SIFT descriptors associated with an image of the host desk of the Aria® buffet, and descriptor C (405C) including SIFT descriptors associated with an image of the Aria® concierge desk.

Alex, the general manager of Aria® could use user interface 400A to transmit content object 422C, content object 424A and content object 426A to object generation engine 404. Object 422A comprises an image of Phil Ivey playing Texas Hold'em in the Aria® poker room to generate interest in the poker room, object 424A comprises a video of a model getting a massage at the hotel to advertise the hotel amenities, and object 426A comprises an audio of the lunch menu to assist the visually impaired. Brandi, an advertising executive could use user interface 400B to transmit content object 422B to object generation engine 404. Content object 422B comprises an image of an advertisement for skydiving classes located right off the Las Vegas strip. Carina, a system manager responsible for creating a mobile app for Aria® visitors, could transmit content object 422C, an image of a map of the Aria® hotel, to object generation engine 404, and could also associate the various descriptors 405A, B and C with one or more content objects. In the example provided, Carina associates content objects 422A and 424A with descriptor 405A, content objects 422B and 426A with descriptor 405B, and content objects 422C and 424B with descriptor 405C. This association could be based on any suitable parameters as determined by one or more users or the object generation engine itself.

Object generation engine 404 could transmit the image AR content objects 422, video AR content objects 424, audio AR content objects 426, and optionally the associated descriptors to AR content database 420 via network 415.

In embodiments, suitable content objects AR content objects 422 can additionally be identified via the content types associated with the recognized objects at step 340. Thus, for a particular recognized object, the AR content objects 422 can be selected based on the descriptor of the object itself, as well as according to the categorization or other classification associated with the object.

Figure 5:
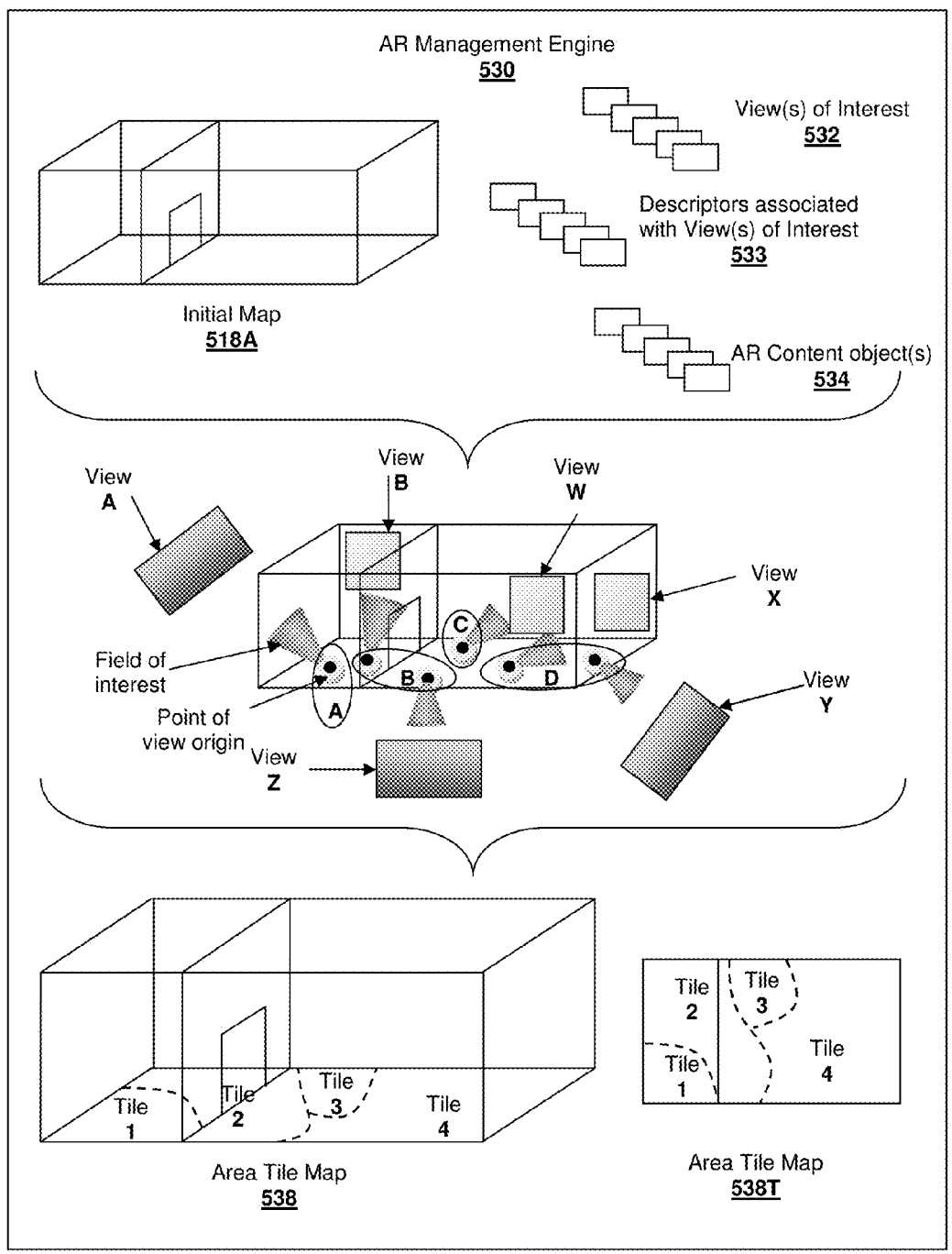
FIG. 5 is a schematic showing a generation of a tessellated area map.

FIG. 5 is a schematic of an AR management engine 530 generating area tile maps 538 and 538T. AR Management engine 530 comprises, among other things, an initial map 518A, view(s) of interest 532 (e.g., point of view origin data, field of interest data, etc.), descriptors associated with view(s) of interest 533, and AR content object(s) 534. Based on the aforementioned area data and optional other data (e.g., signal data, etc.), AR management engine 430 establishes AR experience clusters A, B, C and D within the initial map 518A as a function of the set of AR content objects 534 and the views of interest 532. In the example shown in FIG. 5, Cluster A comprises a first point of view origin (e.g., a coordinate) having a first field of interest leading to view A. View A could comprise various objects of interest to which descriptors could be associated. Continuing on the example from FIG. 4, the point of view origin associated with view A could comprise the Aria® poker room along with the Aria® poker room host desk to which descriptor 405A is associated. Thus, when a user uses a mobile device to scan view A (or portion thereof) from the related point of view, the user could be presented with content objects 422A and 424A described above.

Furthermore, Cluster B comprises the point of view origins having fields of interest leading to views B and Z; Cluster C comprises the point of view origin having the field of interest leading to view W; and Cluster D comprises the point of view origins having fields of interest leading to views X and Y. Each of clusters B, C and D could include point of view origin(s) having corresponding fields of interest and views including objects of interest. The establishing of clusters could be based on any suitable parameter(s), including for example, the number of objects of interests viewable from a point of view origin, field of view or view, a number of AR content objects associated with objects of interests within a view of interest, a file size of AR content objects of interest within a view of interest, a AR content object type (e.g., image, video, audio, etc.), a number of views of interests viewable from point of view origins within an area of interest, or any other suitable parameter(s). Moreover, any suitable algorithm(s) or method(s) of clustering can be utilized to establish experience clusters, including for example, centroid-based clustering (e.g., k-means clustering, etc.), hierarchical clustering, distribution-based clustering, density-based clustering, or any other suitable algorithms or methods.

Based at least in part on the AR experience clusters established above, area tile maps 438 and 538T (perspective view and top view) could be generated. The area tile maps could comprise a plurality of tessellated tiles covering at least some of the area of interest (e.g., a portion of the Aria® Hotel and Casino, etc.), and one or more of the tiles could be bound to a subset of the AR content objects 534. In the example of FIG. 4, the tessellation comprises an aperiodic tessellation, and is based at least in part on the density of AR content objects associated with each point of view origin. Viewed from another perspective, the number of different AR content objects that could be populated onto a user device and instantiated by a user device in each tile is substantially similar (i.e., within 25% (more preferably within 10%, within 8%, within 5%, within 3%, or within 1%) by number of AR content objects). For example, the point of view origin in Tile 1 is associated with 25 AR content objects, the point of view origins in Tile 2 are associated with 23 AR content objects (15 in view Z, 8 in view B), the point of view origin in Tile 3 is associated with 25 AR content objects, and the point of view origins in tile 4 are associated with 26 AR content objects (1 in view X, 25 in view Y).

It should also be appreciated that a tessellated map could have more than two dimensions of relevance (e.g., at least 3 dimensions, at least 5 dimensions, at least 10 dimensions, at least 25 or even more dimensions of relevance, etc.). Viewed from another perspective, the tessellation could be based not only on a spatial dimension, but could additionally or alternatively be based on a signal strength (e.g., RSS, CSS, WiFi signal strength, cellular signal strength, demographic, etc.) or any other suitable dimension(s).

One should appreciate that a cluster, a view of interest or any portion thereof (e.g., point of view origin, a field of interest, a view associated with a point of view origin, etc.) could be owned and managed by one or more entities. For example, Card Player® magazine could purchase or rent the view of interest comprising view A, and determine what AR content objects are associated with objects viewable from the point of view origin in Cluster A. Moreover, because Card Player® magazine would own and manage the point of view origin, the magazine could modify the field of interest and location or scope of view A if desired. For example, the field of interest could be dynamic in nature, and could include the Aria® poker room host desk during busy hours (e.g., where the room has reached 50%, 70% or even 90% or more of the allowed occupancy), but include a TV screen in the poker room during slow hours in place of the host desk. Thus, a user scanning the host desk during busy hours could be presented with AR content, while a user scanning the host desk during slow hours could be presented with no AR content (or different AR content). Similarly, a user scanning the TV screen during busy hours could be presented with no AR content, while a user scanning the TV screen during slow hours could be presented with AR content.

Figure 6:
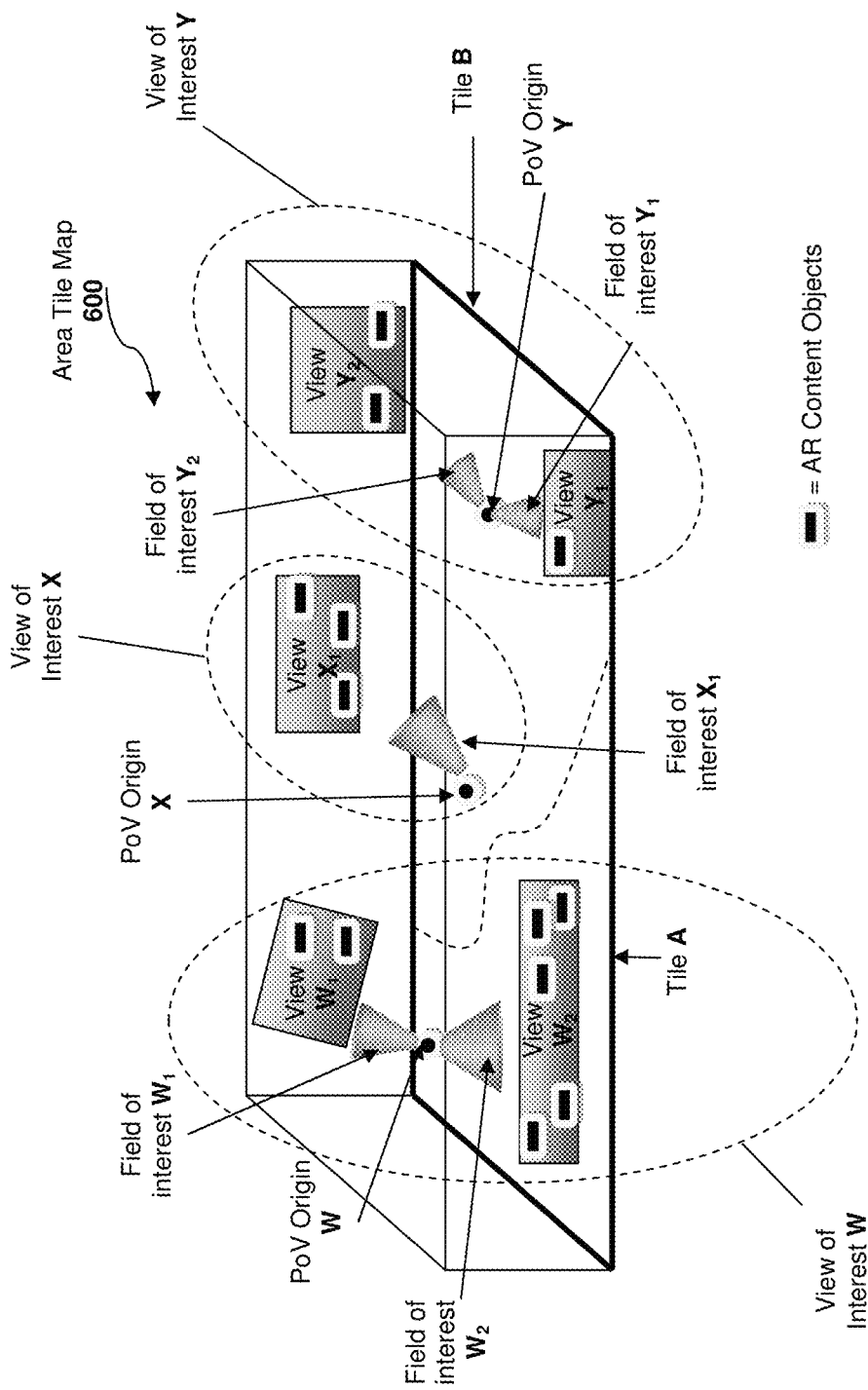
FIG. 6 is a schematic showing an area tile map based on view of interest clusters.

FIG. 6 is a schematic showing an area tile map 600 having been generated based on experience clusters. In the example shown, a portion of an area of interest is divided into tiles A and B, which were generated based on experience clusters established based on the number of AR content objects associated with each view of interest in the portion. View of interest W includes a point of view or view-point origin W having two fields of interest (fields of interest $W_1$ and $W_2$) facing two different views (views $W_1$ and $W_2$). Views $W_1$ and $W_2$ each include objects of interest tied to AR content objects (2 content objects and 5 content objects, respectively). View of interest Y includes a point of view origin X having a field of interest $X_1$ facing view $X_1$. View $X_1$ includes objects of interests tied to three AR content objects. View of interest Y includes a point of view or view-point origin Y having two fields of interest (fields of interest $Y_1$ and $Y_2$) facing two different views (views $Y_1$ and $Y_2$). Views $Y_1$ and $Y_2$ each include objects of interest tied to AR content objects (1 content objects and 2 content objects, respectively).

Based on the number of AR content objects tied to each point of view origin of views of interest, experience clusters are generated. Here, the first experience cluster includes point of view origin W, while the second includes point of view origins X and Y, such that the experience clusters of an area of interest (or portion thereof) include substantially the same density of AR content objects by number. Based on these clusters, Tile A is generated including point of view origin W, and Tile B is generated bordering at least a portion of Tile A and including point of view origins X and Y.

When a user navigating the real world area of interest gets close enough to a portion represented by Tile A (e.g., within 50 feet, within 25 feet, within 10 feet, within two feet, within 1 foot, etc. of any portion of tile A), it is contemplated that the user's device could be auto-populated with the 7 AR content objects bound to view of interest W. When the user scans view $W_1$ with a device having a sensor (e.g., camera, etc.), it is contemplated that a system of the inventive subject matter could utilize object recognition techniques to recognize objects of interest within view $W_1$ and instantiate one or more of the AR content objects associated with the objects of interest. Similarly, when the user scans view $W_2$, the system could recognize objects of interest within view $W_2$ and instantiate one or more of the AR content objects associated therewith. When the user navigates closer to Tile B, it is contemplated that the user device will be auto-populated with the AR content objects associated with that tile (e.g., associated with Views $W_1$, $W_1$, and $W_1$, etc.). Additionally or alternatively, it is contemplated that as the user navigates close to Tile B (or any other tile other than Tile A), or as the user navigates away from Tile A (e.g., within 50 feet, within 25 feet, within 10 feet, within two feet, within 1 foot, etc. of any portion of tile A), the populated AR content objects associated with Tile A could be deleted from the user device automatically or manually.

Viewed from another perspective, a user device in an area of interest could obtain and store AR content objects associated with one or more tiles corresponding to the area of interest. For example, it is contemplated that any time a user device is within 5 feet of a location corresponding with a tile or an area map, the user device will store AR content objects associated with that tile. Thus, if the user device is at a location within 5 feet of two or more tiles, the user device could store AR content objects associated with two or more tiles simultaneously. Moreover, it is also contemplated that the user device, even when located within 5 feet of two or more tiles, could store AR content objects only associated with one of the tiles (e.g., based on a hierarchy, etc.).

It should be noted that while the tiles shown in FIGS. 5-6 show separate, adjacent tiles, it is also contemplated that tiles can overlap within an area of interest. In these embodiments, the AR content objects to be presented can include AR content objects associated with both tiles, either together or with filtering (according to priority, size, etc.). Alternatively, the AR content objects to be presented to the user can (i.e., which tile's AR content objects to show) can be determined based on the user's device, a user identification, information about the user (e.g., interests, context, preferences, etc.). Thus, the inventive subject matter is considered to include management of tile overlaps and associated rules for presenting AR content from overlapping tiles. For example, AR content can be prioritized for presentation or rendering based on the fees paid by content providers; a high fee could increase the prioritization of the AR content for example. Other factors that could influencing prioritization or placement of AR content from overlapping tiles include personal preferences, demographics, movement of consumer toward or away from tiles, news events, or other factors.

Tiles can be constructed at varying levels of fidelity and resolution to accommodate the various capabilities of several device classes, and tile size can be tuned based on device memory capabilities, network capacity, etc.

It should be appreciated that a point of view origin could comprise any suitable space shape or size, perhaps even geofenced areas or, for example, 10 square feet of a floor, 5 square feet of a floor, 2 square feet of a floor, 1 square foot of a floor, etc. Similarly, a field of interest and/or view of interest could comprise any suitable shape or size.

One should also appreciate that a view of interest could comprise more than a point of view origin, a field of interest, a view associated with a point of view interest, an object of interest, a descriptor set or combinations or multiples thereof. Among other things, a view of interest could comprise an owner (as discussed above), metadata, a direction, an orientation, a cost, a search attribute, or combinations or multiples thereof.

As used herein, a "search attribute" could comprise an object or description that could be used to select a field of view (or narrow the possible fields of views) to which a user would like to associate content objects with respect to. For example, where an area of interest comprises Magic Mountain®, one possible view of interest could comprise, among other things: the entry point of the line for Batman® the ride as a point of view origin; a field of interest facing 35 degrees above eye level from four feet above the ground, and leading to a view that is ten feet wide (horizontal distance) and four feet long (vertical distance). The view of interest could also comprise a concession stand, a sign pointing to the Green Lantern® ride, and a bench on a hill, each of which could be viewable from the entry point of the Batman® line. In this example, the view of interest could comprise search terms that would assist a provider of AR content objects (or other users) in differentiating this view of interest from others within Magic Mountain, or even from other areas of interests. Exemplary search terms could include, for example, "Batman," "Green," "DC®," "comic," "superhero," "rest," "food," "drink," or any other term that describes a characteristic of the view of interest, the area of interest, or the AR content objects that are suitable (or even preferred) for presentation in the view of interest. It is also contemplated that a search attributes could be included in a view of interest, which could describe a characteristic of a user experience with respect to the view of interest. For example, a search attribute could comprise an average length of stay of a user within a specified radius of the point of view origin. With respect to the Batman® line entry point, a search attribute could include 20 minutes as the average length of stay of a user within ten feet of the entry point due to the slow pace at which roller coaster ride lines tend to move.

In some embodiments, it is contemplated that a behavior of a user (or user device) could determine some or all of the content that is provided to the user via the user device. For example, and continuing on the example above, a user having a user device in his pocket at Magic Mountain® may stand at a relatively still position for seconds or even minutes at a time. Where the user device scans audio data of announcements over loud-speakers (e.g., safety warnings, etc.) for a pre-determined period of time (e.g., one minute, etc.), this could trigger the user being presented with audio content via the user device advertising Flash® passes, which allow a user to hold his or her place in line electronically. Other examples of behaviors or events that could trigger a provision of content could include, among other things, an interaction with AR content, a comment, a speed of movement, a type of movement, a gesture, a height, or any other suitable behavior or event.

It should also be appreciated that in some embodiments, a system could be configured to allow a user to interact with AR content presented by commenting, tagging, editing, ranking or otherwise modifying or adding to the AR content. This modification or addition could be viewable to all users of the system, a subset of users (e.g., those subscribing to a specific app, friends of the user providing the modification or addition, etc.), or only to be user providing the modification or addition as a reference point.

A contemplated use of a system of the inventive subject matter is to build a scavenger hunt to guide consumers into portions of an area of interest (e.g., a portion of a mall, etc.). Such a system could provide incentives for users to navigate a specific portion of the area, for example, by providing a prize, a reward, a promotion, a coupon, or other virtual item upon an event. The requisite event could comprise simply being located in the portion at any time, or could be more interactive, for example, being located in the portion for a minimum time or a specific time, capturing an image of an object viewable from the portion, making a gesture with the user device in the portion, or any other suitable event.

Location-based services generally rely on one or more sources of information to determine a location of a device. Typical sources include GPS data, Wi-Fi signal strength, or even image features as used in SLAM technologies. However, such techniques often fail in various scenarios. For example, within buildings, GPS signals could be weak or Wi-Fi signals might not be present. Further, in remote locations or natural settings, signals could also be weak or not present. With respect to SLAM-based location technologies, some locations lack sufficient differentiating image features that allow for tracking location of a device. Consider a scenario where a device (e.g., cell phone) is located within a warehouse that has no distinguishing image-based features. That is, there is little distinction from one location to another. Such settings make is very difficult to anchor augmented reality (AR) content within images of the real-world settings.

Another issue with current location-based AR services, especially those based on SLAM, require a user to hold their imaging device (e.g., cell phone, tablet, etc.) up in front of the user. Such a stance can become uncomfortable after a short time for the user. Further, such a stance places the device between the real-world and the user, which restricts the user's interactions with the real-world. A better approach would allow a user to naturally interact with the real-world while their location tracking device is held in a more natural setting.

To address these issues, some embodiments can include encoding a wide area with location information. The location information can take on many different forms including covering surfaces (e.g., walls, floors, ceilings, etc.) with one or more patterns that can be visually observed via an electronic device (e.g., captured via a digital representation of the pattern in the environment such as via image data or video data). The pattern preferably comprises sufficient structure that, when imaged, a location device can observe one or more trackable features within the pattern. The features can also be bound to locations or used as AR content anchor points. Based on the location information (e.g., feature position, device orientation, etc.), the device is able to determine its location within the wide area.

The pattern can take on many different forms. In some embodiments, the pattern is truly random. For example, the wide area (e.g., warehouse, floors, etc.) can be randomly coated with paint, perhaps infra-red reflective paint. In such a case, the random pattern can then be scanned into a mapping module (e.g., a set of computer-executable instructions stored on non-transitory storage media that, when executed by one or more processors, carry out its described functions) that identifiers features in the random paint pattern via one or more image processing algorithms (e.g., SIFT, FAST, etc.) and binds the features to location information. The resulting map can then be deployed in other devices so that they can determine their locations in the environment based on observed features derived from images of the random pattern. The paint pattern can be deployed via a robot, through a suitably configured paint roller, or other means. Further, such a random pattern could be integrated within wall paper, floor tiles, ceiling tiles, or other surface cover at manufacturing time.

Further the pattern could be a natural, existing pattern or texture on a surface. For example, the pattern could comprises wood grain in floor boards (e.g., oak, bamboo, etc.), or concrete. When the setting has acceptable natural textures, a capturing device can be used to map out the area by scanning the all relevant surfaces to build a panoramic map of the locations. Further, the device can be configured to generate a confidence score indicating the acceptability of the natural texture, or other pattern for that matter, on a location-by-location basis.

In other embodiments, the pattern can comprise a generated, pseudo random pattern that covers the wide area. Consider a scenario where a warehouse wishes to encode their warehouse floor with location information. A mapping module can create a pseudo random pattern that creates a feature pattern for the entire space. Perhaps the pattern can be generated from a mapping function based on an initial known seed, which is then concatenated with location information (e.g., X, Y coordinates). The mapping function generates the necessary pattern that should be placed at corresponding X, Y coordinates in the warehouse. For example, each floor tile could be printed with the pattern for that tiles location. The advantageous of such an approach is that the pattern is procedurally generated, which allows devices to derive its location procedurally, assuming it has the initial seed, rather than storing a large, wide area map database.

As more concrete example, consider a case where SIFT is used for deriving features that are then used to determine location of a device. SIFT can have a 128-byte descriptor that represents a feature in an image. In such a case, the pseudo random pattern can be generated by applying an initial seed that is unique to the location to an MD5 hash algorithm (MD5 can generate 128-bit hash values). Once the function is primed with the seed, the X, Y coordinate of a floor tile can be concatenated with the original seed hash multiple times, four times for X and four times for Y. The result of each hash is a 128-bit number. The four hashes for X can be concatenated to form the first 64 bytes of a descriptor and the four hashes for Y can be concatenated to form the last 64 bytes of the descriptor, where the full 128-bytes represents a descriptor corresponding to the floor tile. The 128-byte number can then be considered a SIFT descriptor. For example, if the seed for a location is S and a coordinate is (X, Y), the 128-byte descriptor could be generated as follows:

Descriptor bytes 0-15: X1=MD5(Seed+X)
Descriptor bytes 16-31: X2=MD5(X1)
Descriptor bytes 32-47: X3=MD5(X2)
Descriptor bytes 48-63: X4=MD5(X3)
Descriptor bytes 64-79: Y1=MD5(Seed+Y)
Descriptor bytes 80-95: Y2=MD5(Y1)
Descriptor bytes 96-111: Y3=MD5(Y2)
Descriptor bytes 112-127: Y4=MD5(Y3)

If the hash function is SHA-512, which generates 512 bits of output, then the descriptor could be:

Descriptor bytes 0-63: SHA512(Seed+X)
Descriptor bytes 64-127: SHA512(Seed+Y)

The mapping module uses the 128-bytes descriptor to generate an image pattern that would generate the same descriptor (or a nearest neighbor descriptor for the space) when processed by SIFT. This approach allows for generation of a large number of address spaces. Location can be determined by initially calibrating the device in the local area and using accelerometry to generate a location window. The device can then use the hash mapping functions to generate the descriptors that should be present or observable within the location window.

In some embodiments, a paired dictionary learning process can be used to produce a method of "inverting" any type of image descriptors (SIFT, SURF, HOG, etc.). This can be achieved by keeping original source image patches for all descriptors used to build a dictionary via clustering approaches (K-means, hierarchical K-means, agglomerative clustering, vector quantization, etc.). Once the dictionary is built, it gives a bidirectional mapping from image patch space to descriptor space. From each cluster of descriptors representing a dictionary element, we can obtain an average image patch that would generate a descriptor belonging to that cluster. The chosen size of the dictionary determines the resolution of the mapping between image patches and descriptors, and therefore the size of the available address space of image patches to use when marking up a location. The "inverted" image patterns obtained by this process can be applied to ensure a unique descriptor configuration at each (X,Y) location in a space.

In alternative embodiments, the mapping module can use a mapping function that is bidirectional in the sense that coordinates generate a desired pseudo random pattern (e.g., a descriptor, feature, keypoint, etc.), and that a descriptor generates a corresponding coordinate. For example, one possible two-way mapping function might include use of a log value. For example, a log (e.g., ln(x)) of the X coordinate of a map location can be taken to generate a value. The value can be the first part of a descriptor (e.g., the first 64 bytes of an SIFT descriptor). The second part of the descriptor could be ln(Y) after suitable conversion to a 64 byte value. When the descriptor is detected in the field (or a nearest neighbor), the descriptor can be separated into its X and Y parts. The X and Y coordinates can be found by applying an exp( )function to the parts. In some embodiments, X and Y can have only integer values, perhaps as grid locations. Thus, when the exp( )function is applied to observed descriptor values, the resulting nearest integer is likely the proper coordinate.

Yet another possible type of pattern includes a fractal pattern. The pattern can include fractal features that aid in determining location or anchor points at different scales, depth of field, or distances. For example, the pattern could comprise multiple layers where each layer comprises a different color. A first color can be used to generate a fine grained pattern that corresponds to specific location scale (e.g., millimeter, centimeter, etc.). A second pattern having mid-level grained features that provide location scales in an intermediate range (e.g., about 10 cm, 1 foot, etc.). Yet another pattern in a third color having very course grained feature might provide location information at a more course grain level (e.g., 1 meter, 10 feet, etc.).

Deploying disclosed patterns on a floor surface also provides additional advantages. Users are able to track their location by pointing the image sensors of their devices toward the floor rather than holding the device up. This approach represents a more natural arm position which reduces user fatigue. Further, the user is able to interact with the real-world setting without having the device interposed between the setting the user, thus giving rise to a more natural interaction.

It should be further appreciated that the pattern can be deployed on other surfaces besides the floor. The patterns can be deployed on the walls so that forward facing cameras are able to determine locations of foreground objects (e.g., people, obstacles, machines, etc.) relative to background (i.e., walls) locations. Further, ceilings can also be encoded with patterns (e.g., ceiling tiles, girders, pipes, etc.). In such a case, imaging devices that have a back facing camera, a camera that faces the user, could image the ceiling while also imaging the floor. Thus, the device would be able to derive location information from the ceiling, or both the floor and ceiling. In view that such cameras could have different image capturing resolutions, it is possible that the floor and ceiling patterns could be asymmetric with respect to the location resolving power.

These techniques can be employed to determine a user's position within an area of interest. More specifically, the user's computing device capture a digital representation of a pattern on a surface (e.g., wall, ceiling, floor) within the area of interest, and can determine what tile (for example, Tiles 1-4 of FIG. 5 or Tiles A and B of FIG. 6) a user is currently in by determining the user's position within the area of interest and correlating it to tile information obtained from the system. Then, as described above, the AR content objects can be managed and presented to the user based on their presence within the tile.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An augmented reality (AR) content management system comprising:
    an area database configured to store area data related to an area of interest;
    an AR content database storing AR content objects; and
    an AR management engine coupled with the area database and the AR content database, and configured to:
        obtain an initial map of the area of interest from the area data within the area database;
        derive a set of views of interest from the initial map and area data;
        obtain a set of AR content objects related to the set of views of interest;
        establish AR experience clusters within the initial map as a function of the set of AR content objects and the set of views of interest;
        generate a tile map of the area based on the AR experience clusters, wherein the tile map comprises a plurality of tessellated tiles covering at least some of the area of interest, and wherein at least one tile of the plurality of tiles is bound to a subset of the set of AR content objects; and
        configure a device to obtain at least a portion of the subset of the AR content objects based on the tile map.

2. The system of claim 1, wherein the area data comprises image data.

3. The system of claim 2, wherein the image data comprises still image data.

4. The system of claim 2, wherein the image data comprises video image data.

5. The system of claim 2, wherein the image data comprises real-time image data.

6. The system of claim 1, wherein the area data comprises signal data.

7. The system of claim 6, wherein the area data comprises a compressive sensing of signals (CSS).

8. The system of claim 6, wherein the area data comprises a WiFi signal.

9. The system of claim 6, wherein the area data comprises a beacon signal.

10. The system of claim 1, wherein the area of interest comprises an interior setting.

11. The system of claim 10, wherein the interior setting comprises at least one of the following: an office space, a retail space, an arena, a school, a healthcare facility, a library, a home, and a building.

12. The system of claim 1, wherein the area of interest comprises an outdoor setting.

13. The system of claim 12, wherein the outdoor setting comprises at least one of the following: a stadium, a park, a wilderness area, an arena, a route, a highway, and a rooftop.

14. The system of claim 1, wherein the initial map comprises a computer aided design (CAD) drawing.

15. The system of claim 1, wherein the initial map comprises a three dimensional representation of the area of interest.

16. The system of claim 1, wherein the initial map comprises a blueprint.

17. The system of claim 1, wherein the AR management engine is further configured to obtain the initial map by generating the initial map.

18. The system of claim 1, wherein at least one view of interest of the set of views of interest comprises a view-point origin.

19. The system of claim 1, wherein at least one view of interest of the set of views of interest comprises at least one field of view.

20. The system of claim 1, wherein at least one view of interest of the set of views of interest comprises at least one of the following: an owner, metadata, a direction, an orientation, a cost, a search attribute, a descriptor set, and an object of interest.

21. The system of claim 1, wherein at least one view of interest of the set of views of interest comprises a view-point origin, at least one field of view, and an object of interest.

22. The system of claim 1, wherein at least one view of interest of the set of views of interest comprises a view-point origin, at least two fields of view, and an object of interest.

23. The system of claim 1, wherein the set of AR content objects include at least one of the following: a virtual object, chroma key content, a digital image, a digital video, audio data, an application, a script, a promotion, an advertisement, a game, a workflow, a kinesthetic, a tactile, and a lesson plan.

24. The system of claim 1, wherein the AR management engine is further configured to obtain the set of AR content objects based on a characteristic of the initial map.

25. The system of claim 1, wherein the AR management engine is further configured to obtain the set of AR content objects based on a user selection.

26. The system of claim 1, wherein the AR management engine is further configured to obtain the set of AR content objects based on a search query.

27. The system of claim 1, wherein the AR management engine is further configured to obtain the set of AR content objects based on a context of an intended use.

28. The system of claim 1, wherein the AR management engine is further configured to obtain the set of AR content objects based on a recommendation.

29. The system of claim 1, wherein the AR management engine is further configured to obtain the set of AR content objects based on a request.

30. The system of claim 1, wherein the AR management engine is further configured to present at least a portion of the AR content objects on a display of the device.

31. The system of claim 1, wherein at least one of the AR experience clusters represent a subset of the views of interest and associated AR content objects.

32. The system of claim 1, wherein the tessellated tiles comprise non-regular tessellated tiles.

33. The system of claim 1, wherein the device comprises a mobile device.

34. The system of claim 33, wherein the mobile device comprises at least one of a cell phone, a tablet, a watch, and a vehicle.

35. The system of claim 1, wherein the device comprises a server.

36. The system of claim 1, wherein the device is coupled with a cloud server.

37. The system of claim 1, wherein the device comprises a data center.

38. The system of claim 1, wherein at least one tile of the plurality of tessellated tiles is associated with an identification.

39. The system of claim 1, wherein at least one tile of the plurality of tessellated tiles is associated with an owner.

40. The system of claim 1, wherein at least one tile of the plurality of tessellated tiles is associated with an object of interest.

41. The system of claim 1, wherein at least one tile of the plurality of tessellated tiles is associated with a set of descriptors.

42. The system of claim 1, wherein at least one tile of the plurality of tessellated tiles is associated with an advertiser.

43. The system of claim 1, wherein at least one tile of the plurality of tessellated tiles is associated with a cost.

44. The system of claim 1, wherein at least one tile of the plurality of tessellated tiles is associated with a time.

45. The system of claim 1, wherein at least two tiles of the plurality of tessellated tiles is dynamic.

46. The system of claim 1, wherein the AR management engine is further configured to cause the mobile device to:
   capture a digital representation of a pattern within the area of interest;
   derive at least one descriptor from the digital representation of the pattern;
   calculate the position of the mobile device as a function of the at least one descriptor; and
   determine a tile from the plurality of tiles corresponding to the calculated position.

47. The system of claim 46, wherein the at least one descriptor comprises at least a first section and a second section.

48. The system of claim 47, wherein the first section comprises values associated with an X coordinate in planar space and the second section comprises values associated with a Y coordinate in planar space.

49. An augmented reality (AR) content management system comprising:

an area database configured to store area data related to an area of interest;

an AR content database storing AR content objects; and an AR management engine coupled with the area database and the AR content database, and configured to:

obtain an initial map of the area of interest from the area data within the area database;

derive a set of views of interest from the initial map and area data;

obtain a set of AR content objects related to the set of views of interest;

establish AR experience clusters within the initial map as a function of the set of AR content objects and the set of views of interest;

generate a tile map of the area based on the AR experience clusters, wherein the tile map comprises a plurality of aperiodically tessellated tiles covering at least some of the area of interest, and wherein at least one tile of the plurality of tiles is bound to a subset of the set of AR content objects; and configure a device to obtain at least a portion of the subset of the AR content objects based on the tile map.

50. An augmented reality (AR) content management system comprising:

an area database configured to store area data related to an area of interest;

an AR content database storing AR content objects; and an AR management engine coupled with the area database and the AR content database, and configured to:

obtain an initial map of the area of interest from the area data within the area database;

derive a set of views of interest from the initial map and area data;

obtain a set of AR content objects related to the set of views of interest;

establish AR experience clusters within the initial map as a function of a density of a subset of AR content objects associated with the set of views of interest, the subset of AR content objects being a subset of the set of AR content objects;

generate a tile map of the area based on the AR experience clusters, wherein the tile map comprises a plurality of tessellated tiles covering at least some of the area of interest, and wherein at least one tile of the plurality of tiles is bound to the subset of the set of AR content objects;

and configure a device to obtain at least a portion of the subset of the AR content objects based on the tile map.

* * * * *